United States Patent [19]
Allen

[11] 3,970,795
[45] *July 20, 1976

[54] MEASUREMENT OF NOISE IN A COMMUNICATION CHANNEL

[75] Inventor: Edgar Robert Allen, Stanmore, England

[73] Assignee: The Post Office, London, England

[ * ] Notice: The portion of the term of this patent subsequent to June 17, 1992, has been disclaimed.

[22] Filed: July 16, 1974

[21] Appl. No.: 488,993

[52] U.S. Cl............................ 179/15 BF; 324/57 N
[51] Int. Cl.² ........................................... H04J 1/16
[58] Field of Search ............... 179/15 BF, 175.3 R; 324/57 N; 325/67, 133, 363

[56] References Cited
UNITED STATES PATENTS

| | | | |
|---|---|---|---|
| 2,987,586 | 6/1961 | Berger | 179/15 BF X |
| 3,357,007 | 12/1967 | Wike | 179/15 BF UX |
| 3,586,993 | 6/1971 | Buck | 179/15 BF X |
| 3,683,282 | 8/1972 | D'Amato | 324/57 N X |
| 3,691,306 | 9/1972 | Molo | 179/15 BF |
| 3,787,628 | 1/1974 | Van Dijk | 179/15 BF |

*Primary Examiner*—David L. Stewart
*Attorney, Agent, or Firm*—Kemon, Palmer & Estabrook

[57] ABSTRACT

TNR (Traffic Noise Ratio) is defined as the ratio of the portion of the noise representing a multi-channel signal that occurs in a narrow bandwidth (including inherent, and intermodulation) to the noise in the same bandwidth, in the absence of a traffic signal in that bandwidth, under specified traffic conditions. The TNR of a communications link is measured by measuring the noise power level in a predetermined bandwidth in a quiet channel with reference to a signal representative of the power that would be in the quiet channel if it was loaded under peak traffic conditions. The noise power level is measured using a digitally stepped automatic attenuator controlled by a feedback loop which includes filters for isolating the noise in the quiet channel.

4 Claims, 4 Drawing Figures

MEASUREMENT OF NOISE IN A COMMUNICATION CHANNEL

This invention relates to a method of and apparatus for assessing the noise performance of a frequency multiplexed, multi-channel communications link.

In a communications system it is frequently necessary to transmit a large volume of information between two particular points. This may be achieved by frequency division multiplexing (FDM), the information to be transmitted between the two points. This means that there are a plurality of information-carrying channels each with its own associated frequency range existing between the two points. The noise on the signal received at one of the points can originate in three basic ways, namely:

1. It can be already present in the signal transmitted from the other point.
2. It can be noise of a fundamental nature, e.g. quantum noise, Johnson noise etc.
3. It can be caused by cross-modulation and inter-modulation between the different information channels.

The noise under headings (2) and (3) is dependent on the performance of the communication link existing between the two points. The noise under heading (1) can in no way be influenced by the performance of the communications link. To ensure optimum performance of the system it is thus important to monitor noise of types (2) and (3) in a communications link. The noise level introduced by the communications link is advantageously represented by the ratio of noise level introduced by the link to the mean signal level received over the link. An internationally recognised parameter which is representative of this ratio is the NPR or noise power ratio of the system. This is defined as the ratio of the part of the noise (including inherent and intermodulation) representing a multi-channel signal that occurs in a narrow bandwidth, to the inherent and intermodulation noise in the same bandwidth when signals are not applied in that band but are applied over the remainder of the multi-channel frequency range.

The NPR is usually measured by feeding white noise of suitable bandwidth and level to simulate a fully loaded system signal over the communications link, i.e. white noise is applied across all the channels in the link. A quiet bandwidth within a channel may be simulated by inserting a narrow bandstop filter in the output of the white noise generator, the noise in the frequency range of the bandstop filter is measured with and without the filter and the ratio of the measurements gives the NPR for that particular frequency. It is customary to measure NPR in three widely separated bandwidths.

In order to measure NPR in this manner it has hitherto been necessary to take the communications link out of commission for normal communication the duration of the measurements which procedure can result in a communications link of 2,700 or more channels being out of commercial service for up to 3 hours. NPR measurements made in this fashion are expensive to carry out both in terms of technician time and lost revenue. It would thus be advantageous if NPR, or a parameter which is substantially equivalent to NPR, could be measured without the need to take a communications link out of service. Since the measurement of NPR requires the introduction and transmission of white noise to and over the communications link, NPR cannot itself be measured in this way. However, the frequency characteristic of peak traffic on, say a telephone, communications link is substantially equivalent to white noise, and it is therefore proposed to use existing traffic conditions, preferably peak traffic as a substitute for white noise.

The present invention seeks to provide a method of and apparatus for measuring TNR (traffic noise ratio), which is defined as the ratio of the portion of the noise representing a multi-channel signal that occurs in a narrow bandwidth (including inherent, and intermodulation) to the noise in the same bandwidth, in the absence of a traffic signal in that bandwidth, under specified traffic conditions. TNR is a function of traffic loading.

In order to measure TNR is is necessary to have only a single information channel out of commission (quiet) when the measurements are made and to make the measurement in that channel. In practice it may be advantageous to maintain, say three, permanently quiet channels in the communications link, i.e. dedicated channels.

Numerical values of TNR measured under peak traffic conditions are found for practical purposes to be substantially equal, numerically, to NPR values for the same system.

According to the invention there is provided a method of assessing the noise performance of a FDM communications link by measuring TNR of the FDM communications link comprising isolating a quiet channel in said communications link when said communications link is carrying commercial traffic, measuring the noise power level in a predetermined bandwidth in said quiet channel with reference to the noise power of white noise in the predetermined bandwidth, said white noise having a frequency spectrum simulating a peak traffic frequency spectrum.

According to a further aspect of the invention there is provided apparatus for assessing the noise performance of a FDM communication link, and including means for meauring TNR of the FDM communications link, said apparatus comprising filter means adapted to isolate a predetermined bandwidth in a channel which filter means is coupled to input terminal means adapted for connection to the communications link, and a power measuring means arranged to measure a noise signal at an output of said filter means.

According to a yet further aspect of the present invention there is provided apparatus for measuring noise power level in a predetermined frequency bandwidth with reference to a predetermined level comprising: a controllable attenuator connected in series with the path through a band pass filter to a detector; and a comparator adapted to compare an output of said detector with an adjustable reference level; an output of said comparator being connected to and adapted to control a gate which is connected so as to control pulses from a clock pulse generator having an output which is connected to and adapted to control in stepwise manner said controllable attenuator.

The term power as herein used is to be interpreted as referring to any signal parameter functionally related to the energy carried by said signal in unit time, An embodiment of the invention and modification thereof will now be described, by way of example, with reference to the accompanying drawings in which.

Figure 1:
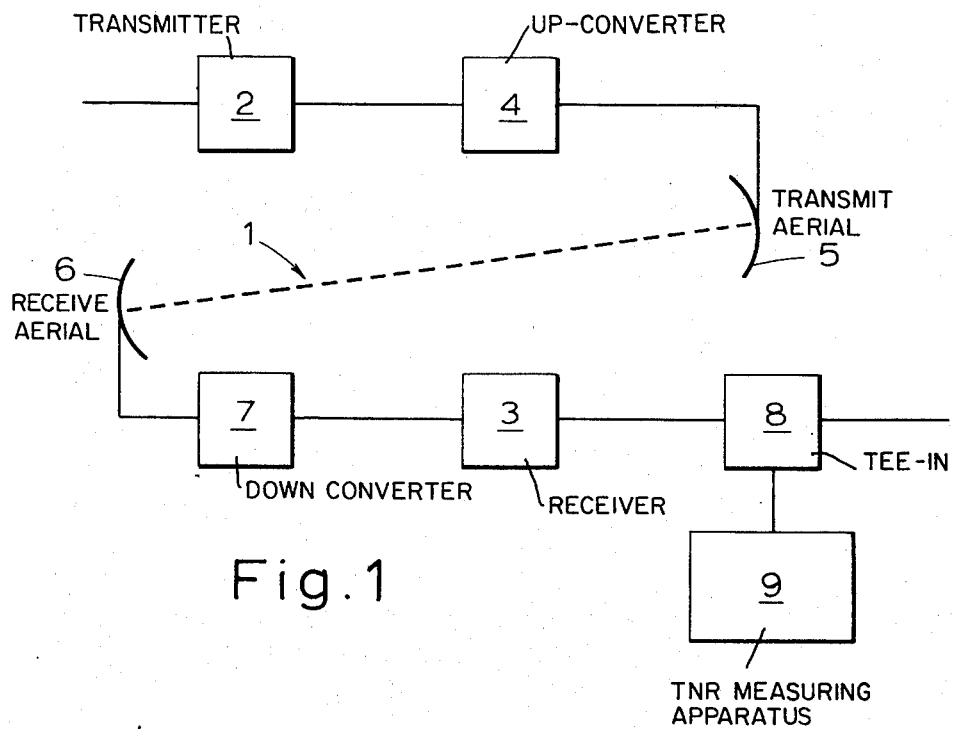
FIG. 1 shows schematically part of a microwave system including a communications link.

Referring now to the drawings, and FIG. 1 in particular, there is shown a microwave link 1 extending between two points in the system. The points are located at a sending station 2 and a receiving station 3 respectively. The output of sending station 2 is transmitted via an up-converter 4 and thence via a waveguide to aerial 5. The microwave signal is then transmitted via a series of microwave repeaters (not shown) to a receive aerial 6. The receive signal, is coupled via waveguide to down-converter 7 where it is converted to intermediate frequency (70 MHz), the output from down-converter 7 is then passed to receiver 3 where it is converted to base-band (0–10 MHz for 1800 channels, or 0–12 MHz for 2,700 channels, or 0–4 MHz for 960 channels). The output of the receiver 3 is then passed to a repeater and thence possibly to an exchange. Apparatus 9 for measuring the TNR is connected via a Tee-In 8 to the output of receiver 3.

The TNR measuring apparatus accesses the noise performance of the communication link by measuring the noise level in a predetermined bandwidth on a quiet channel with reference to a white noise signal whose spectrum simulates the mean peak traffic level. The TNR measuring apparatus enables predetermined bandwidths in a number of different channels to be selectively isolated and includes a digital noise level measuring meter. Calibration circuits are also used in conjunction with the measuring apparatus to enable measurements to be made with reference to a predetermined level.

Figure 2:
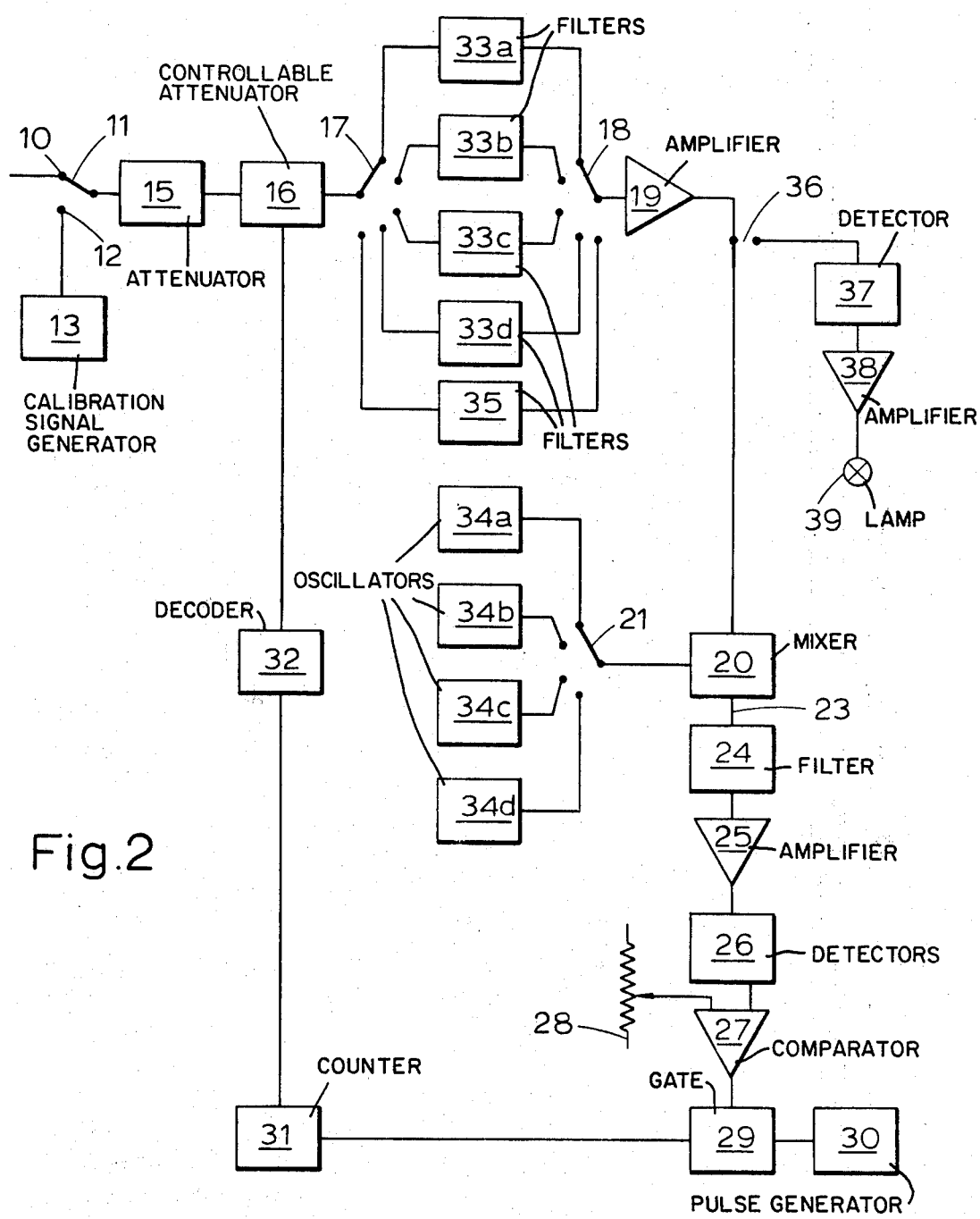
FIG. 2 shows schematically a TNR tester.

With reference now also to FIG. 2, the signal from the output of the tee-in 8 is fed to one terminal 10 of a two-position selector switch 11, whose other fixed contact 12 is connected to a calibration signal source 13. The wiper of switch 11 is connected via manually operated attenuator 15 and digitally controllable attenuator 16 to the wiper of a five position switch 17 whose fixed contacts are connected via respective 4 KHz band pass filters 33A . . . 33D to corresponding fixed contacts of a switch 18, to a wideband amplifier 19, to a mixer 20 which is selectively fed via switch 21 from a bank of oscillators 34A . . . 34D to produce a signal at output line 23 which is fed via filter 24 and an audio amplifier 25 to a detector 26. The output of detector 26 is a DC signal. A comparator 27 is fed with an input from the detector 26 and another input from a reference source 28. The output of comparator 27 controls a gate 29 which selectively passes signals from a pulse source 30 to a count and display unit 31. An output of count and display unit 31 passes via decoder/driver unit 32 to control the controllable attenuator 16. If the input signals to comparator 27 are unequal, the output of comparator 27 holds gate 29 open so that pulses from pulse generator 30 increase the count held by counter 31. Thus attenuator 16 is stepped so as to increase attenuation until the output of comparator 27 is zero, i.e. until the output of detector 26 is equal to the reference level derived from source 28. The number of attenuator steps required to reduce the output of comparator 27 to zero will correspond to the signal level output from detector 26 and will be indicated by count and display unit 31. Hence the display unit 31 indicates a power level of the signal input to wiper 11 relative to the reference level as set by source 28.

Figure 3:
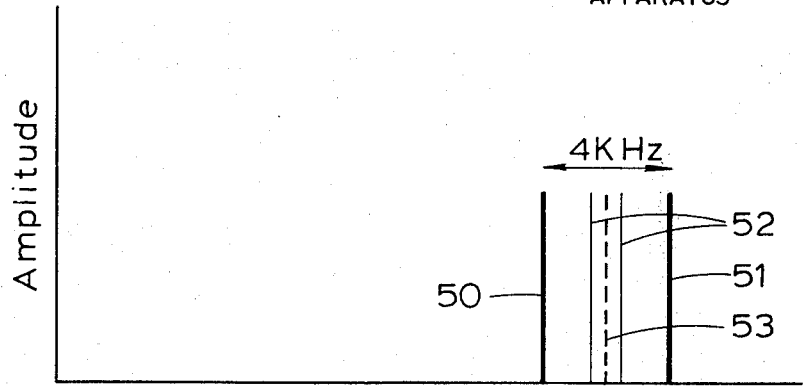
FIG. 3 shows a part of the spectrum of the base-band signal.
Figure 4:
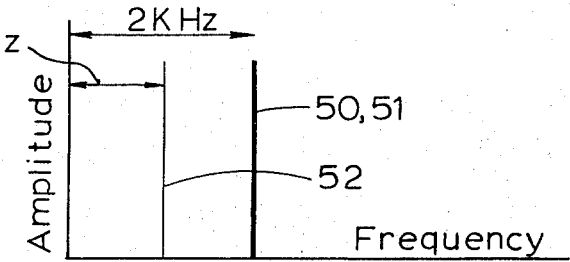
FIG. 4 shows the spectrum after the mixer of FIG. 2.

The filters 33A . . . 33D each isolate a related one of four channels, see FIG. 3. Each channel is 4 KHz wide with the carrier arranged at the edge of the channel at 50, (lower side band suppression). After the base-band signal has been mixed with a frequency 53 corresponding to the mid-point of the channel, the frequency spectrum appears as shown in FIG. 4. The mid-point frequency is transformed into zero frequency, and frequencies below the frequency 53 are folded over into the positive frequency domain. This means that if a low-pass filter isolating frequencies below 1.05 KHz is used, the effective frequency range isolated from the channel is a central frequency band of 2.1 KHz between limits 52. These functions are performed by the set of crystal oscillators 34A . . . 34D each of which supplies a frequency equal to the mid-point frequency of selected one of the four channels. The mixing is carried out in mixer 20 and the output passed via low-pass filter 24, having a 1.05 KHz bandwidth, and an audio amplifier 25 to detector 26. Thus, detector 26 looks at a frequency band of 2.1 KHz in the centre of a channel.

In order to measure TNR it is first necessary to calibrate the instrument. This may be done in one of several ways. Firstly generator 13 may be a white-noise generator whose output is set to that of the traffic level under peak traffic conditions specified for the system, e.g., − 20 dBm, received from Tee-in 8. In order to calibrate the device, switch 11 is set to connect generator 13 to the test apparatus, switches 17 and 18 are set so that unit 35 is connected into the system. Unit 35 is an attenuator, or equaliser, which simulates the power loss in the pass band of filters 33A . . . 33D over the broad band of the white-noise generator. Switch 36 is then set to connect the output of broadband IF amplifier 19 to detector 37, the output of detector 37 is then amplified by very high gain amplifier 38 and fed to filament lamp 39. The high gain amplifier 38 makes the lamp 39 very sensitive to changes in output of detector 37, a slight change in this output is amplified to such an extent by amplifier 38, that it makes the difference between lamp 39 being on or off. When the circuit is switched into the calibration mode, as described above, attenuator 15 is adjusted so that lamp 39 just lights (with attenuator 16 set to zero attenuation). The output of generator 13 is then reduced by 20 dB by an attenuator (not shown) internal to the generator, and switches 17 and 18 are set to select a first of the filters 33, switch 36 is set to connect the ouput of amplifier 19 to the input mixer 20, and switch 21 is set to an oscillator 34 appropriate to the selected filter 33 and the reference level generator 28 is adjusted to produce a read out of 20. The reference level generator 28, provides four levels, one for each filter. Each of these levels is set in turn.

The white noise generator may be located at the far end of the communications link and the calibration procedure performed on white-noise transmitted over the link. This procedure has the advantage that any degradation of the system, i.e. system output not − 20 dBm, is compensated for. The indicator lamp 39 and amplifier 38 may of course be replaced by a meter.

Again it is possible to use pure tones for calibration if the signal levels are set before calibration, to simulate the system output of − 20 dBm.

The initial calibration using lamp 39 ensures that the output of amplifier 19 is at a suitable level to operate the rest of the apparatus. The adjustment of reference level generator 28 ensures that measurements are made relative to a white-noise simulation of peak traffic in the frequency bands of interest. The calibration operation need not be carried out prior to every measurement but only if there is reason to believe that some relevant parameter e.g. gain of amplifier 19 have drifted. Apart from the calibration operation the setting of attenuator 15 is not altered.

In order to ensure that TNR values numerically equivalent to NPR are obtaind it is necessary that the traffic signal from the link should correspond to peak traffic conditions. This can be checked by connecting the traffic signal via switch 11 to the apparatus in the calibration mode and seeing whether lamp 39 lights or alternatively by connecting a level meter across the traffic signal input.

To measure TNR after the device has been calibrated, the switch 11 is positioned to connect the device to the communications link under test. In this link three channels are strapped out. These channels have frequency bands corresponding to three of the filters 33A. . . .33D. Four filters are provided to enable the device to be used with communications links carrying one, two or three hypergroups. The centre frequencies of these filters are 534 KHz, 2438 KHz, 3886 KHz, and 7602 KHz. The first three centre frequencies are those recommended by the CCIR (International Radio Consultative Committee) for the measurement of NPR. However, the recommended CCIR frequency near to 7.6 MHz is in fact exactly 7600 KHz. Unfortunately in U.K. systems this frequency is used as a carrier frequency, so it is necessary to displace the mean frequency from this by 2 KHz.

The noise on each of these three channels is measured in turn by switching in the appropriate one of filters 33, oscillators 34, and using the appropriate reference voltage generated by reference level generator 28. The device operates in the way previously described.

If values of TNR which are numerically equivalent to NPR are to obtained, it is necessary to measure TNR under peak traffic conditions. The level of traffic can be checked as previously described.

What we claim is:

1. In a FDM communications link having a plurality of channels, and wherein a multiplicity of said plurality of channels is carrying traffic and at least one channel, called a quiet channel, carries no traffic; apparatus for assessing the noise performance of said FDM communications link, comprising:
   a. Tee-in means for tapping off a portion of a broad band signal transmitted over said communications link;
   b. filter means connected to said tee-in means for isolating a predetermined bandwidth lying within said quiet channel;
   c. power measuring means including signal mixing means and detector means operable to produce a DC output representative of the power level in said predetermined bandwidth of a noise signal;
   d. display means;
   e. comparator means having said DC output applied to a first input, a reference level applied to a second input and an output connected to operate said display means; and
   f. said power measuring means further including a controllable attenuator connected between said tee-in means and said filter means, an output from said display means connected to control said controllable attenuator so that said comparator means has zero output.

2. Apparatus as claimed in claim 1 wherein said display means are counter display means for counting clock pulses derived via a gate controlled by the output of said comparator.

3. Apparatus as claimed in claim 2 wherein said tee-in means includes a switch means having a first pole connected to said communications link and a second pole connected to white noise generator means for providing a white noise signal simulating a peak traffic signal on said communications link.

4. Apparatus as claimed in claim 2 wherein said tee-in means includes a switch means having a first pole connected to said communications link and a second pole connected to a pure tone generating means for providing a calibration signal.

* * * * *